United States Patent [19]

Cheng et al.

[11] Patent Number: 4,724,226
[45] Date of Patent: Feb. 9, 1988

[54] BORIA-PROMOTED HP CATALYST

[75] Inventors: Wu-Cheng Cheng, Columbia; Carmo J. Pereira, Silver Spring, both of Md.

[73] Assignee: W. R. Grace & Co., New York, N.Y.

[21] Appl. No.: 910,586

[22] Filed: Sep. 23, 1986

[51] Int. Cl.$^4$ .............................................. B01J 21/02
[52] U.S. Cl. ..................................... 502/204; 502/202; 502/206; 502/207; 502/205; 208/209; 208/213
[58] Field of Search ................ 502/202, 204, 206, 207

[56] References Cited

U.S. PATENT DOCUMENTS

| | | | |
|---|---|---|---|
| 2,952,721 | 9/1960 | Thomas et al. | 502/207 |
| 2,967,822 | 1/1961 | Moy et al. | 502/204 |
| 2,976,333 | 3/1961 | Dixon et al. | 502/202 |
| 2,983,672 | 5/1961 | Dobres et al. | 502/204 |
| 3,293,170 | 12/1966 | Goble et al. | 502/207 |
| 3,475,325 | 10/1969 | Doane et al. | 502/204 |
| 3,631,030 | 12/1971 | Brenner | 502/207 |
| 3,637,525 | 1/1972 | O'Hara | 502/204 |
| 3,856,702 | 12/1974 | McArthur | 502/202 |
| 3,883,442 | 5/1975 | McArthur | 502/206 |
| 3,971,735 | 7/1976 | Asano et al. | 502/202 |
| 4,030,903 | 6/1977 | Rittler | 502/204 |
| 4,285,835 | 8/1981 | Kovach | 502/202 |

FOREIGN PATENT DOCUMENTS

| | | | |
|---|---|---|---|
| 662808 | 5/1963 | Canada | 502/202 |
| 719727 | 10/1965 | Canada | 502/202 |
| 1184331 | 12/1962 | Fed. Rep. of Germany | 502/202 |
| 1205520 | 1/1963 | Fed. Rep. of Germany | 502/202 |
| 1146854 | 5/1961 | France | 502/202 |
| 2546769 | 12/1984 | France | 502/202 |
| 2561945 | 10/1985 | France | 502/202 |
| 6133035 | 10/1981 | Japan | 502/204 |
| 1112049 | 7/1983 | Japan | 502/206 |
| 958983 | 5/1964 | United Kingdom | 502/202 |

Primary Examiner—Andrew H. Metz
Assistant Examiner—Helane Myers
Attorney, Agent, or Firm—Edward J. Cabic

[57] ABSTRACT

A boria promoted hydrotreating catalyst is made having a microporous region with high surface area for desulfurization and preferably a macroporous region to transport large metal containing molecules into the interior of the catalyst particle. The alumina support has 0.1 to 5% boria to form a hydrotreating catalyst which minimizes the formation of tetrahedrally coordinated boron. It is calcined to a temperature of 1400° F. or less to maintain a high desulfurization activity. Conventional hydrotreating catalytic elements from Groups VB, VIB, VIIIB and VA of the Periodic Table are added. Less than 75% of the boron is in tetrahedral coordination as measured by Magic Angle Spinning $^{11}$B NMR.

26 Claims, 1 Drawing Figure

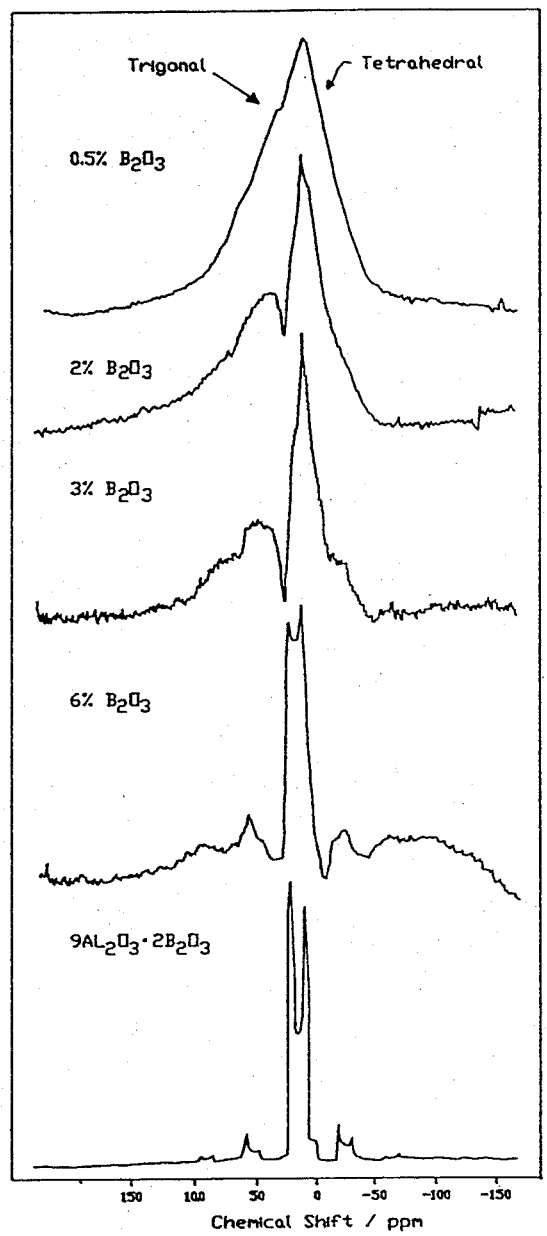

BORIA-PROMOTED HP CATALYST

BACKGROUND OF THE INVENTION

1. Field of the Invention

This invention relates to a boria-promoted hydroprocessing catalyst which can be used for hydroprocessing heavy feeds.

2. Description of the Previously Published Art

Catalysts have been made for various processes where boron has been added.

U.S. Pat. No. 4,139,492 discloses a method of preparing hydrotreating catalysts with an impregnation solution of Group VIB compounds, Group VIII compounds and $HBF_4$. U.S. Pat. No. 3,666,685 discloses a method of preparing hydrotreating catalysts with 1 to 5% boron phosphate. In these patents, the use of boria to control macropore volume was not recognized. Additionally, the high acidity which reagents such as $HBF_4$ and boron phosphate impart to the supports make these catalysts less suitable for processing heavy feeds. The present invention does not require the use of $HBF_4$ or boron phosphate.

U.S. Pat. Nos. 3,954,670 and 3,993,557 disclose a method of preparing hydrocracking catalysts by hydrolyzing a mixture of aluminum alkoxide and boron alkoxide. U.S. Pat. No. 2,713,037 discloses a method of preparing alumina containing catalysts by hydrolyzing aluminum alkoxide with water in the presence of a silica hydrosol, ammonium molybdate or boric acid. These methods of preparation differ from that of the present invention, which does not require the use of aluminum alkoxide. Aluminum alkoxide is relatively more expensive than conventional sources of alumina, such as those described in U.S. Pat. No. 4,154,812.

Boria-alumina supports have been used to make hydrocracking catalysts, such as described in U.S. Pat. No. 4,500,645, Japanese patent Nos. 57207546, 57141492 and 58020232 and French patent No. 2487220. However, these catalysts all contain an additional zeolitic component which is not required in the catalyst of the present invention. None of these patents discuss the promotional effect of boria in desulfurization.

A lube oil hydrocracking catalyst is disclosed in U.S. Pat. No. 3,617,532 which contains 8 to 15% boria. An aluminum borate catalyst made by mulling alumina with boric acid followed by extrusion is disclosed in U.S. Pat. No. 3,856,705. The specified level of boria was between 8 and 40%. The level of boria in these patents is higher than the range specified in the present invention and has been found to be detrimental to catalyst performance.

U.S. Pat. No. 3,018,244 discloses an isomerization and reforming process using catalysts prepared by impregnating $Pt/Al_2O_3$ and $Rh/Al_2O_3$ with $H_3BO_3$ and $HBF_4$. Boria was said to promote the isomerization activity. The promotional effect of boria in desulfurization was not mentioned, nor was the use of this type of catalyst in hydrotreating.

U.S. Pat. No. 4,399,057 discloses a method of preparing a catalyst support which has an average pore diameter of at least 180 Angstrom units, at least 0.8 cc/g of its pores between 0 and 1200 Angstrom units and at least 0.1 cc/g of its pores between 1200 and 50,000 Angstrom units. This catalyst support is prepared by heating a composite of two or more oxides, including boria and alumina, at a temperature between 1300° and 1700° F. in an atmosphere of steam. The present invention does not place such a restriction on the pore size distribution. Furthermore, we have found that heating the catalyst support up to such a high temperature will cause a lowering of desulfurization activity.

OBJECTS OF THE INVENTION

It is an object of this invention to produce a hydroprocessing catalyst which has controllable amounts of macroporosity while having improved desulfurization and metals removal properties.

It is a further object of this invention to impregnate an alumina based refractory oxide with a promoter which will control macroporosity and improve desulfurization and metals removal.

It is a further object of this invention to produce a hydroprocessing catalyst which has high demetallation activity and high activity maintenance in treating heavy feedstocks.

These and further objects will become apparent as the description of the invention proceeds.

SUMMARY OF THE INVENTION

Hydroprocessing catalyst having an optimum alumina pore structure for demetallization and having a promotion for desulfurization and for metals removal can be made by adding to the alumina prior to extrusion or forming from 0.1 to 5 weight percent of boria which is $B_2O_3$. The alumina particles are then extruded or formed to produce the desired shaped catalyst particle. Due to the presence of this boria during extrusion, the desired amount of macroporosity is achieved. Furthermore, the $B_2O_3$ when added at this level acts as a promoter for desulfurization and for metals removal. The boria may be added to the alumina either by impregnation or co-precipitation. Thereafter the conventional hydrotreating catalytic metals from Groups VB, VIB, VIIIB and VA of the Periodic Table are added.

In another embodiment the boria may be added to preformed alumina catalyst particles by impregnation. In this case it does not significantly affect the pore structure of the alumina catalyst particle which has already been formed, but it does act as a chemical promoter for desulfurization and demetallation.

An important feature of the invention is to control the loading of boria. On a $B_2O_3$-$Al_2O_3$ catalyst boron can be either trigonally or tetrahedrally coordinated. The coordination about boron may be determined by the use of Magic Angle Spinning $^{11}B$ NMR. We have discovered that when the $B_2O_3$ loading is at a level of 5% or less the boron is divided roughly into 40% trigonally and 60% tetrahedrally coordination. At a loading above 5% $B_2O_3$ there is a sudden increase in tetrahedral boron as a result of an apparent phase change. It is believed this new phase is not advantageous for a hydroprocessing catalyst and accordingly the $B_2O_3$ level should be maintained at a level of 5% or lower to minimize the formation of tetrahedrally coordinated boron. The amount of boron in the tetrahedral coordination should be less than 75% with less than 65% also being a preferred embodiment.

A further feature of the invention is to control the calcination temperature after the boria is added to the alumina. In general, the catalyst particles made from a mixture of boria and alumina should not be calcined at temperatures which exceed 1400° F. since calcination above this temperature results in a loss of desulfurization activity.

BRIEF DESCRIPTION OF THE DRAWING

The Figure is an NMR scan for $B_2O_3$-alumina catalysts which have varying amounts of boria.

DESCRIPTION OF THE PREFERRED EMBODIMENTS

Catalyst for hydroprocessing of heavy feeds must be effective for both demetallation and desulfurization. Such a catalyst needs not only to have a high surface area of active components for desulfurization, but it also needs to have sufficient macroporosity to transport the large metal-containing molecules to the interior of the catalyst particle. We have found boria to be both a structural promoter for alumina because it is effective in controlling the degree of macroporosity, and a chemical promoter for alumina containing cobalt-molybdenum and nickel-molybdenum catalytic metals because the boria is effective in increasing the desulfurization and demetallation activities of these catalysts. By incorporating alumina powders with low levels of $B_2O_3$ on the order of 0.1 to 5% wt % of the resulting mixture, the mixture can be readily extruded into catalyst pellets with a controllable amount of macroporosity. Additionally, $B_2O_3$ present at the level of 0.1 to 5% serves as a promoter for desulfurization and metals removal if the support is calcined at controlled temperatures which do not exceed about 1400° F. The boria may be added to the alumina by either impregnation or by co-precipitation.

The boron which will be in the boria form may be added in various forms such as boron oxide, sodium metaborate, potassium metaborate, metaboric acid, orthoboric acid and tetraboric acid. The preferred reagents are orthoboric acid and sodium metaborate. If sodium metaborate is used a subsequent washing step to remove the sodium would be required.

In one embodiment boria is added to the catalyst by impregnation of the alumina powder. This is most conveniently done inside a muller, such as a Simpson Mix-Muller, by mixing a boric acid solution into the alumina powder until a paste suitable for extrusion is obtained. The paste can then be formed into extrudates of desired size and shape. Alternatively, other alumina particles can be formed such as drop gel beads, mechanically formed beads or pellets.

Alternatively the boric acid solution may be impregnated on pre-formed alumina catalyst particles, such as extrudates, spheres or other shapes practiced in the art. This can be accomplished by either the incipient wetness method where only enough solution to fill the pores of the alumina particles is used or by immersing the alumina particles in a solution of boric acid for a predetermined amount of time followed by draining off the excess solution. The extrudates are dried and calcined at a temperature not to exceed 1400° F. and impregnated a second time with the active catalytic metals, such as cobalt-molybdenum or nickel-molybdenum.

Still another method of introducing boria to the catalyst is to precipitate alumina in the presence of a component of boron, such as sodium metaborate. This is followed by washing and drying of the powder. The boria-alumina mixed powder can then be formed into the desired shape. The alumina-boria particles are then calcined at a temperature not exceeding 1400° F. and impregnated with the catalytic metals.

In producing catalysts according to the present invention an optimum desulfurization activity for the catalyst is obtained at $B_2O_3$ loadings of between 0.1 and 5 wt %, and preferably between 0.5 and 3 wt %. Above 5 wt % $B_2O_3$, the activity decreases.

After the boria has been added to the alumina and calcined, the hydrotreating catalytic elements are added. These elements are from Group VB of the Periodic Table, which are V, Nb and Ta; Group VIB which are Cr, Mo and W; Group VIIIB which are Fe, Co, Ni, Ru, Rh, Pd, Os, Ir and Pt; and Group VA, which are P, As, Sb, and Bi. The preferred catalytic elements are Co, Ni and Mo.

The catalytically active elements may be incorporated by impregnation. This is done by either filling just the pores of the support with the impregnation solution or by immersing the support in an excess volume of the impregnation solution for a predetermined period of time, followed by draining of the excess solution. In general, any soluble compounds of the elements may be used in impregnation. The preferred sources of molybdenum are ammonium heptamolybdate, ammonium dimolybdate and molybdenum trioxide. The preferred sources of cobalt and nickel are their nitrates, acetates and carbonates. The preferred range of molybdenum loading is from 3 to 25 wt % on the total catalyst basis as $MoO_3$. The preferred range of cobalt and nickel is from 0.1 to 8 wt % as the oxides. After the metal compounds are added, the catalyst is dried and calcined at a temperature not to exceed about 1100° F., so as to limit the formation of the less active cobalt or nickel aluminate and limit the sintering of molybdenum oxides.

A key development in understanding the present invention is the use of $^{11}B$ Magic Angle NMR to characterize the coordination about the boron atoms in the catalyst. When using a Bruker-400 NMR instrument, which has a 400 MHz field strength, boron resonates at 128 MHz. We used a pulse width of 12 microseconds, a relaxation delay of 5 seconds, and a sweepwidth of 50,000 Hz. Our sample size was generally 0.25 cm$^3$, our spinning speed was 4500 Hz and typically 1000 to 10,000 scans were collected for each spectra.

The $^{11}B$ NMR spectra of samples containing 0.5, 2, 3 and 6% $B_2O_3$ are shown in the Figure. Trigonally coordinated boron is represented by a peak at a chemical shift between 30 and 50 ppm relative to boron trifluoride etherate $BF_3(C_2H_5)_2O$. Tetrahedrally coordinated boron is represented by a doublet with a chemical shift in the region of 20 to 0 ppm. These are consistent with the values of chemical shift reported in earlier studies by Ganapathy et al. in J. Chem. Phys. 77, 4360 (1982) and Turner et al. in J. Magnetic Resonance 67, 544 (1986).

The relative amounts of trigonally versus tetrahedrally coordinated boron may be obtained by integrating the areas under the peaks. The results are summarized in Table 1.

TABLE 1

| Coordination Geometry of Boron in $B_2O_3$—$Al_2O_3$ Samples as Determined by Boron-11 NMR | | |
|---|---|---|
| Wt % $B_2O_3$ | % Boron in Trigonal Coordination | % Boron in Tetrahedral Coordination |
| 0.5 | 40 | 60 |
| 2.0 | 43 | 57 |
| 3.0 | 39 | 61 |
| 6.0 | 12 | 88 |

At low boria loadings such as at 3% boria or less the boron is divided roughly into 40% trigonally coordinated and 60% tetrahedrally coordinated. At a loading of 6% $B_2O_3$, there is a sudden increase in the amount of tetrahedral boron. We believe this is due to a change of phase causing the boron to move into a more orderly structure, such as those of aluminum borate, 9 $Al_2O_3.2B_2O_3$. The properties of 9 $Al_2O_3.2B_2O_3$ have been studied by Gielisse and Foster (Nature, 195, 69 (1962)). The boron in aluminum borate is completely tetrahedrally coordinated. The $^{11}B$ NMR spectrum of an aluminum borate sample, prepared by heating stoichiometric quantities of alumina and boria for 3 hours at 1450° C., is included in the Figure for comparison. From this data we believe that at a high boria loadings, much of the boron is tetrahedrally coordinated. This phase of boria-alumina appears to have an adverse effect on the activity of the catalyst. Thus we prefer to have catalyst formulations where less than 75% of the boron is in tetrahedral coordination.

The temperature of the subsequent calcination after the incorporation of the boria also has a strong influence on the activity of the catalyst. The activity of the catalyst decreases significantly in samples which have been calcined at a temperature greater than 1400° F. as will be demonstrated in Example 5.

The macroporosity in a catalyst particle can be influenced by the addition of boria. By macroporosity we mean pores with a pore diameter larger than 600 Angstrom units. A solution of boric acid may be mulled with alumina powder to produce a paste suitable for extrusion. The extrudates produced from this boric acid-impregnated paste are also macroporous. In general the degree of macroporosity increases with the level of boria in the paste. Increased macroporosity in the particle will reduce the bulk density of the catalyst and this will reduce the desulfurization activity for a given volume of catalyst. We believe that an optimal macropore volume can be obtained by adding 0.1 to 5 wt % boria and more preferably 0.5 to 3 wt% boria during the preparation of the alumina paste. By the addition of boria we achieve macropore volumes of from 0.1 to 0.5 $cm^3/g$.

Furthermore, Example 4 will demonstrate that the addition of boria in the loading range described increases the desulfurization and demetallation performance of the catalyst. Boria is indeed a chemical promoter. Catalysts of high desulfurization and demetallation activity can be prepared by either adding boria to the support prior to the impregnation with the active metals or by impregnating boria on the catalyst already containing the active metals.

Although the exact mechanism of how boria acts as a promoter is not known, we speculate that at low boria loadings the boria may act to facilitate the reduction and sulfidation of molybdenum and to stabilize the sulfur rich phase of molybdenum. The desulfurization activity of boria appears to have a maximum at about 2 to 3 wt % $B_2O_3$. The decline in activity at boria loadings above 5% may be due to a change in the morphology of the surface as shown by $^{11}B$ MASNMR.

The catalysts according to the present invention can be used for hydrotreating of petroleum products in either an ebullating bed or in a fixed bed reactor. The reaction conditions will generally be at a temperature of 500° to 900° F, a pressure between 1000 and 3000 psig and a liquid hourly space velocity, LHSV, of from 0.2 to 5 $hr^{-1}$.

Having described the basic aspects of our invention, the following examples are given to illustrate specific embodiments thereof.

EXAMPLE 1

This example illustrates the addition of the boria to the support by coprecipitation.

To a 1400 cc heel of deionized water was added simultaneously a 900 cc solution of aluminum sulfate (containing 7% $Al_2O_3$), a 600 cc solution of sodium aluminate (containing 23% $Al_2O_3$) and a 400 cc solution of sodium metaborate (containing 39.5 g $Na_2B_2O_4$). Precipitation of the mixed oxide $Al_2O_3$-$B_2O_3$ was carried out under the conditions described in the Sanchez et al U.S. Pat. No. 4,154,812. The precipitate was washed with 20 l of deionized water and dried overnight in a vacuum oven at 100° C. The mixed oxide powder was extruded into 1/16" diameter extrudates and calcined for 2 hours at 1400° F. This sample was designated as Support A.

EXAMPLE 2

This example illustrates the addition of varying amounts of boria to the support by impregnation.

Supports B, C and D were prepared by mulling aqueous solutions containing 1.95 g, 3.89 g and 11.67 g of $H_3BO_3$, respectively, into 300 g of an alumina powder prepared according to the teachings of U.S. Pat. No. 4,154,812, extruding the resulting pastes into 1/16" diameter extrudates and calcining the extrudate for 2 hours at 1100° F. Pore properties of supports A through D are shown in Table 2. As shown, using boria as an extrusion aid, catalyst supports can be prepared having a controllable amount of macroporosity. The macropores facilitate the transport of large metal-containing molecules into the catalyst interior.

TABLE 2

| | PORE PROPERTIES OF SUPPORTS CONTAINING BORIA | | | | | | |
|---|---|---|---|---|---|---|---|
| | $B_2O_3$ wt % | Preparation | $V_{macro}$ cc/g | $d_{macro}$ AU | $V_{micro}$ cc/g | $d_{micro}$ AU | BET Area $m^2g^{-1}$ |
| Support A | 0.5 | Co-precipitation | 0.121 | 2400 | 0.723 | 139 | 208 |
| Support B | 0.5 | Impregnation | 0.22 | 3500 | 0.65 | 93 | 280 |
| Support C | 1.0 | Impregnation | 0.30 | 4000 | 0.63 | 90 | 280 |
| Support D | 3.0 | Impregnation | 0.32 | 4000 | 0.61 | 84 | 291 | where AU = Angstrom Units
$d_{micro} = \frac{4 \times V_{micro}}{BET\ Area}$

EXAMPLE 3

This example illustrates the chemical promotional effect of boria for desulfurization in a finished catalyst.

Catalyst A was prepared without boria by impregnating a solution of cobalt nitrate and ammonium heptamolybdate on calcined gamma-alumina. Catalyst B was prepared by impregnating the same solution as used to prepare Catalyst A on a support containing 2% $B_2O_3$ on gamma-alumina. Catalyst C was prepared by impregnating a solution of $H_3BO_3$ on Catalyst A. All three catalysts were in the form of 20–40 mesh particles.

Their properties as well as their activities for desulfurizing thiophene are shown in Table 3. Catalyst B and C, both containing boria, but prepared differently, show an improvement in desulfurization over Catalyst A. This shows that boria is indeed a chemical promoter.

TABLE 3

COMPARISON OF THIOPHENE DESULFURIZATION ACTIVITIES
(Pressure = atm, Thiophene pressure = 19.7 mm Hg, Temperature = 356° C., 20-40 mesh catalyst)

| Catalyst | Percent $MoO_3$ | Percent CoO | Percent $B_2O_3$ | Relative Activity |
|---|---|---|---|---|
| A | 12.9 | 2.9 | 0 | 1 |
| B | 12.9 | 2.9 | 2% | 1.47 |
| C | 12.9 | 2.9 | 2% | 1.40 |

EXAMPLE 4

This example compares the performance of the boria promoted catalyst of the present invention with other non-boria promoted catalysts having varying amounts of catalytic metals and phosphorus.

The catalyst support prepared in Example 1 (Support A) was impregnated with a solution of ammonium heptamolybdate and cobalt nitrate. The finished catalyst, designated as Catalyst D, contained 12.9% $MoO_3$, 2.9% CoO and 0.5% $B_2O_3$. Catalyst E was prepared by impregnating the same solution used in Catalyst D on a support that contained no $B_2O_3$. Catalyst F, G and H were commercially available cobalt-molybdenum hydroprocessing catalysts. Catalysts G and H contained a small amount of phosphorus. The properties of Catalysts D through H are summarized in Table 4.

TABLE 4

COMPARISON OF CATALYST PROPERTIES

| | Catalyst D | Catalyst E | Catalyst F | Catalyst G | Catalyst H |
|---|---|---|---|---|---|
| $V_{micro}$ (cm$^3$/g) | 0.60 | 0.61 | 0.46 | 0.45 | 0.48 |
| $d_{micro}^1$ (AU) | 132 | 153 | 94 | 107 | 78 |
| $V_{macro}$ (cm$^3$/g) | 0.10 | — | 0.28 | — | — |
| $d_{macro}$ (AU) | 2200 | — | 4000 | — | — |
| BET area (m$^2$/g) | 180 | 159 | 180 | 169 | 248 |
| Pellet density (g/cm$^3$) | 1.01 | 1.06 | 0.96 | 1.31 | 1.27 |
| Bulk density (g/cm$^3$) | 0.61 | 0.61 | 0.58 | 0.80 | 0.70 |
| wt % $MoO_3$ | 12.9 | 12.9 | 16.7 | 20.4 | 14.4 |
| wt % CoO | 2.9 | 2.9 | 3.95 | 3.95 | 3.18 |
| wt % P | — | — | — | 2.04 | 0.11 |
| wt % $B_2O_3$ | 0.5 | — | — | — | — |

$^1$Calculated as: $\frac{4 \times V_{micro}}{BET\ area}$
Where AU = Angstrom Units The above catalysts were used to hydrotreat a Lloydminster atmospheric resid with the properties shown in Table 5.

TABLE 5

PROPERTIES OF LLOYDMINSTER ATMOSPHERIC RESID

| API° | 7.2 | |
| Sulfur | 4.2 | wt % |
| Nickel | 70 | ppm |
| Vanadium | 153 | ppm |
| Conradson Carbon | 16.6 | wt % |
| ASTM Distillation | | |
| 650-975° F. | 30 | wt % |
| greater than 975° F. | 70 | wt % |

Runs were carried out at 750° F., 1500 psi, 5000 scf $H_2$/bbl and a LHSV of 0.5. The results of these runs are shown in Table 6.

TABLE 6

COMPARISON OF STABILIZED INITIAL ACTIVITIES
(Lloydminster Atmospheric Resid, Temperature = 750° F., Hydrogen Pressure = 1500 psi, Hydrogen circulation = 5000 scf/bbl, LHSV = 0.5 h$^{-1}$)

| | Conversion Wt % of | | |
|---|---|---|---|
| | S | V | Ni |
| Catalyst D | 77.7 | 71.7 | 65.6 |
| Catalyst E | 71.7 | 64.4 | 59.3 |
| Catalyst F | 63.8 | 62.9 | 54.8 |
| Catalyst G | 68.3 | 54.0 | 51.7 |
| Catalyst H | 66.1 | 46.2 | 47.3 |

As is readily apparent, the catalyst of this invention (Catalyst D) out-performs a similar catalyst made without boria and all of the commercial catalysts. The presence of interconnected macropores and the promotional effect of boria are believed to be the reasons for the superior performance of Catalyst D.

EXAMPLE 5

This example illustrates the adverse effect of calcining the boria containing support to a temperature above 1400° F. Two catalysts, each containing 12.9% $MoO_3$ and 2.9% CoO were prepared by impregnating a solution of cobalt nitrate and ammonium heptamolybdate on 20-40 mesh particles of a 2% $B_2O_3$ on alumina support, which was prepared by impregnating a boric acid solution on alumina. The two catalysts were prepared in the exact same manner except that the boria-alumina support used in Catalyst 5-1 was calcined for 2 hours at 1000° F. and the boria-alumina support used in Catalyst 5-2 was calcined for 2 hours at 1600° F. The performance of these catalysts in thiophene desulfurization are set forth in Table 7.

TABLE 7

| Catalyst | Percent $B_2O_3$ | Calcination Temperature °F. | Relative Activity |
|---|---|---|---|
| 5-1 | 2% | 1000 | 1.47 |
| 5-2 | 2% | 1600 | 0.85 |

As seen from Table 7, calcination at a temperature above 1400° F. decreased the desulfurization activity of the catalyst.

It is understood that the foregoing detailed description is given merely by way of illustration and that many variations may be made therein without departing from the spirit of this invention.

What is claimed is:

1. A hydrotreating catalyst having a microporous region with high surface area for desulfurization and a macroporous region to transport large metal containing molecules into the interior of the catalyst particle comprising
an alumina support having thereon a minor amount of boria, said boria being present in an amount of 0.1 to 5% based on the weight of the boria-alumina mixture to minimize the formation of tetrahederally coordinated boron, and said impregnated support having been calcined at a temperature not exceeding 1400° F. so as to maintain high desulfurization activity; and at least one hydrotreating catalystic element selected from the group consisting of elements of Groups VB, VIB, VIIIB and VA of the Periodic Table.

2. A catalyst according to claim 1, wherein less than 75% of the boron is in tetrahedral coordination as measured by Magic Angle Spinning $^{11}$B NMR.

3. A catalyst according to claim 2, wherein less than 65% of the boron is in tetrahedral coordination as measured by Magic Angle Spinning $^{11}$B NMR.

4. A catalyst according to claim 1, wherein the macroporous region has a macropore volume of from 0.1 to 0.5 cm$^3$/g of pores with a pore diameter larger than 600 Angstrom units.

5. A catalyst according to claim 1, wherein the amount of boria is present from 0.5 to 3%.

6. A catalyst according to claim 1, wherein the hydrotreating catalytic elements are selected from the group consisting of cobalt, molybdenum, nickel, phosphorus and mixtures thereof.

7. A catalyst according to claim 6, wherein the hydrotreating catalytic elements are cobalt-molybdenum, nickel-molybdenum, nickel-molybdenum-phosphorus, or cobalt-molybdenum-phosphorus.

8. A catalyst according to claim 6, wherein the molybdenum in the form of MoO$_3$, is present from 3 to 25 wt % on the total catalyst basis, the cobalt and nickel, in the form of oxides, are present from 0.1 to 8 wt % on the total catalyst basis and phosphorus, in the form of P, is present from 0.5 to 3 wt % on the total catalyst basis.

9. An alumina hydrotreating catalyst comprising an alumina support having thereon
a hydrotreating catalytic element selected from the group consisting of metals of Groups VB, VIB, VIIIB and VA of the Periodic Table, and
boria present in an amount of 0.1 to 5% by weight based on the total weight of boria and alumina, said catalyst having been made under conditions that the boria was not subjected to calcining temperatures greater than 1400° F.

10. A method of making a hydrotreating catalyst having a microporous region with high surface area for desulfurization and a macroporous region to transport large metal containing molecules into the interior of the catalyst particle comprising
extruding an alumina powder having thereon a minor amount of boria to form catalyst support extrudates, said boria being present in an amount of 0.1 to 5% based on the weight of the boria-alumina mixture to form a hydrotreating catalyst which minimizes the formation of tetrahedrally coordinated boron;
calcining the extrudates at a temperature not exceeding 1400° F. to maintain high desulfurization activity; and
impregnating the calcined catalyst support extrudates with at least one hydrotreating catalytic element selected from the group consisting of metals of Groups VB, VIB, VIIIB and VA of the Periodic Table.

11. A method according to claim 10, wherein after the calcined catalyst support is impregnated with the hydrotreating catalytic elements, the catalyst is calcined at a temperature not exceeding about 1100° F.

12. A method according to Claim 10, wherein the mixture of alumina and boria is obtained by coprecipitation of the mixed oxides.

13. A method according to claim 10, wherein the mixture of alumina and boria is obtained by impregnating alumina powder with a source of boria.

14. A method according to claim 13, wherein the source of boria is boric acid.

15. A method according to claim 10, wherein the boria is present in an amount of between 0.5 and 3% based on the total weight of the alumina and boria.

16. A method according to claim 10, wherein the hydrotreating catalytic elements are selected from the group consisting of cobalt, molybdenum, nickel, phosphorus and mixtures thereof.

17. A method according to claim 16, wherein the hydrotreating catalytic elements are cobalt-molybdenum, nickel-molybdenum, nickel-molybdenum-phosphorus, or cobalt-molybdenum-phosphorus.

18. A method according to claim 16, wherein the molybdenum in the form of MoO$_3$, is present from 3 to 25 wt% on the total catalyst basis, the cobalt and nickel, in the form of oxides, are present from 0.1 to 8 wt % on the total catalyst basis and phosphorus, in the form of P, is present from 0.5 to 3 wt % on the total catalyst basis.

19. A boria promoted alumina hydrotreating catalyst made by the process of claim 10.

20. A method of making a hydrotreating catalyst having a microporous region with high surface area for desulfurization comprising
impregnating an alumina extrudate support with a solution containing a source of boria so as to deposit boria in an amount of 0.1 to 5% based on the weight of the total mixture to form a hydrotreating catalyst which minimizes the formation of tetrahedrally coordinated boron;
calcining the support at a temperature not exceeding 1400° F. to maintain high desulfurization activity; and
impregnating the calcined catalyst support with at least one hydrotreating catalytic metal selected from the group consisting of metals of Groups VB, VIB, VIIIB and VA of the Periodic Table.

21. A method according to claim 20, wherein the alumina support has a macroporous region to transport large metal containing molecules into the interior of the catalyst particle.

22. A method according to claim 20, wherein the alumina support is impregnated by the incipient wetness method.

23. A method according to claim 20, wherein the alumina support is impregnated by immersing the alumina extrudate into the solution containing the source of boria.

24. A method according to claim 20, wherein the alumina support is in the form of extrudates, drop gel beads, mechanically formed beads or pellets.

25. In a process of hydrotreating by using either an ebullated bed or a fixed bed at a temperature between 500° to 900° F., a pressure between 1000 and 3000 psig and a LHSV of 0.2 to 5 hr$^{-1}$, the improvement comprising using as the catalyst the catalyst according to claim 1.

26. In a process of hydrotreating by using either an ebullated bed or a fixed bed at a temperature between 500° to 900° F., a pressure between 1000 and 3000 psig and a LHSV of 0.2 to 5 hr$^{-1}$, the improvement comprising using as the catalyst the catalyst according to claim 9.

* * * * *